United States Patent [19]

Saliba

[11] Patent Number: 5,062,317

[45] Date of Patent: Nov. 5, 1991

[54] BRAKING DEVICE FOR AUTOMOTIVE VEHICLE FITTED WITH AN ELECTRIC MOTOR

[75] Inventor: Bernard Saliba, Choisy-le-Roi, France

[73] Assignees: Automobiles Peuqeot; Automobiles Citroen, both of France

[21] Appl. No.: 524,371

[22] Filed: May 15, 1990

[30] Foreign Application Priority Data

May 16, 1989 [FR] France ................... 89 06376

[51] Int. Cl.⁵ .................. G05G 1/14; H01C 10/00
[52] U.S. Cl. ................................ 74/560; 338/153
[58] Field of Search ............. 74/560, 561, 562, 562.5, 74/512; 338/153; 192/1.56, 1.57

[56] References Cited

U.S. PATENT DOCUMENTS

| | | | |
|---|---|---|---|
| 2,722,847 | 11/1955 | Petrochko | 74/560 X |
| 3,103,905 | 9/1963 | Althens et al. | 74/561 X |
| 3,958,677 | 5/1976 | Spanelis | 192/1.56 |
| 4,135,609 | 1/1979 | La Chiusa | 192/1.57 |
| 4,179,949 | 12/1979 | Hildebrecht | 74/560 X |
| 4,380,002 | 4/1983 | Neill et al. | 74/560 X |
| 4,528,590 | 7/1985 | Bisacquino | 74/512 X |
| 4,695,819 | 9/1987 | Bowsher | 74/512 X |

*Primary Examiner*—Rodney M. Lindsey
*Attorney, Agent, or Firm*—Steinberg & Raskin

[57] ABSTRACT

A braking device for automotive vehicles with a movable electrical braking member formed of a pad made as a lever pivoted to the brake pedal body and adapted to effect at first a selective relative pivoting motion with respect to said body in the direction of actuation of the pedal by the vehicle driver until reaching a position of locking the lever for joint rotation with said pedal body and then a joint pivoting motion with the latter, the pivoting motion of the body producing the mechanical braking effect.

6 Claims, 2 Drawing Sheets

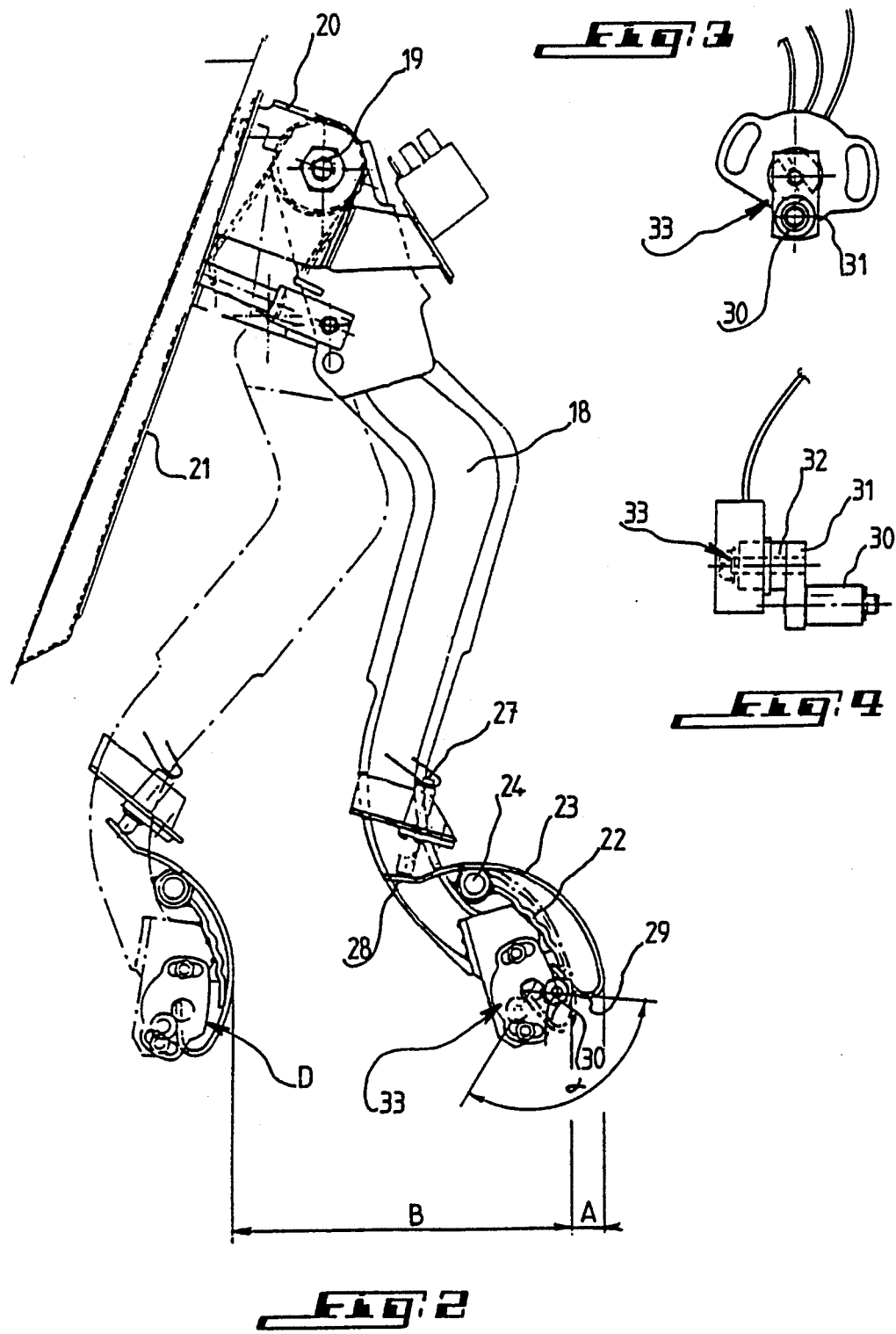

BRAKING DEVICE FOR AUTOMOTIVE VEHICLE FITTED WITH AN ELECTRIC MOTOR

BACKGROUND OF THE INVENTION

The invention relates to a braking device for an automotive vehicle fitted with a machine likely to operate as an electric motor for driving the vehicle, fed with power from a suitable source of electrical energy and as a generator of electric power likely to be transferred to the said source during braking periods and with an electric device for controlling the said machine in accordance with operations of the driver of the vehicle, the said braking device being of the type comprising mechanical braking means which comprise a brake pedal having a pedal body pivotally mounted on a structure of the support made fast with the vehicle and a portion forming a pad for actuating the pedal, and electrical braking means having a movable member likely to be operated by the driver and with which is associated a means for generating control signals for the electric device with a view to transfer energy to the said source of energy.

It is known that the driving of a vehicle moved by an electric motor differs a little from that of a vehicle driven by a conventional engine. The driver has at his disposal an acceleration pedal and the aforesaid brake pedal. The action upon the acceleration pedal allows to progressively increase the speed of the motor by increasing the rate of electric power supplied to the motor. By lifting the foot from the accelerator the driver produces a motor braking effect. The machine then operates as a current generator feeding its energy as electric power into the source of energy provided on board the vehicle.

To increase the braking of the vehicle the driver would operate the brake pedal. In the case of the known devices the pedal as a whole forms both the mechanical and electrical braking means.

Therefore the actuation of the brake pedal would simultaneously produce an electrical braking effect and a mechanical braking effect.

The major inconvenience of the known braking devices is due to the fact that in view of the simultaneous actions of the mechanical braking and of the electrical braking all the kinetic energy is not recovered during the braking phase or step.

OBJECTS AND SUMMARY OF THE INVENTION

The object of the present invention is to provide a braking device which does no longer exhibit the aforesaid drawback of the known devices.

To reach this aim the braking device according to the invention is characterized in that the said movable electric braking member is formed of the said pad which is made as a lever pivotally connected to said pedal body and adapted to carry out a pivotal motion which at first is a relative motion with respect to the said body in the direction of actuation of the pedal under the action of the driver of the vehicle until reaching a position of coupling with the said pedal body for joint pivoting therewith and which is then a joint motion with the latter, the pivoting motion of the said body producing the mechanical braking effect.

BRIEF DESCRIPTION OF THE DRAWINGS

The invention will be better understood and further objects, characterizing features, details and advantages thereof will appear more clearly as the following explanatory description proceeds with reference to the accompanying diagrammatic drawings given by way of non limiting example only illustrating a presently preferred specific embodiment of the invention and wherein:

FIG. 2 is a side view of a braking device according to the invention; and

FIGS. 3 and 4 are front and side views, respectively, of the detail shown at D on FIG. 2.

DETAILED DESCRIPTION

Figure 1:
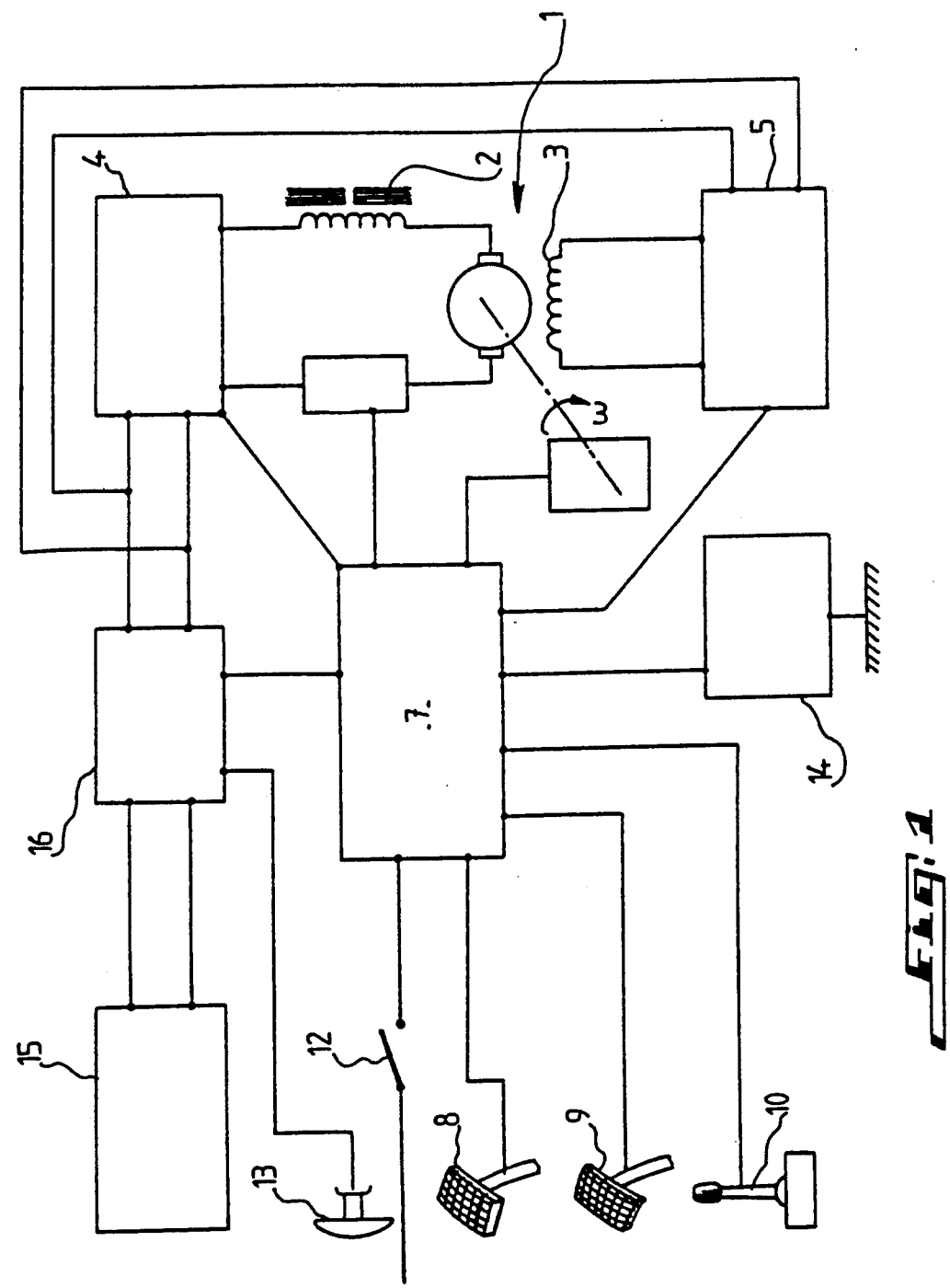
FIG. 1 is a diagrammatic view of the system for controlling an electric machine fitting an automotive vehicle.

On the synoptic FIG. 1 have been shown at 1 the electric machine together with its armature winding 2 and field winding 3 and devices 4, 5 for controlling the armature and field currents, respectively. These devices are operated by a central control device 7 in accordance with electric signals originating from control members operable by the driver of the vehicle, such as the accelerator 8, the brake device 9, the forward run/reverse run selecting lever 10, the switch key 12 and an emergency breaker or cut-out switch 13. The central control device 7 which is at a low electric voltage level is fed with energy from a storage battery 14 of the vehicle. The high voltage circuit comprises a storage battery 15 forming an electric power source associated with the motor. Between this storage battery 15 and the armature control device 4 is interposed a contactor/breaker switch device 16 connected both to the central control device 7 and to the emergency cut-out switch 13.

The construction of the whole system according to FIG. 1 has been made in order to facilitate the understanding of the invention within the whole system. The latter however is known per se and will not be described more in detail. The braking device which forms the specific subject matter of the invention is disclosed hereinafter.

This braking device shown at 9 on FIG. 1 comprises a conventional pedal 18 pivotally connected about an axis 19 carried by a support 20 secured to the apron 21 of the vehicle and a stationary pad 22. To this conventional pedal is added a movable pad 23 which is pivotally connected to the stationary pad 22 for swinging motion about an axis 24.

The movable pad 23 comprises two portions located on either side of the pivot shaft 24, namely a relatively short portion 28 which is adapted to act upon a conventional abutment or limit switch 27 located onto the body of the pedal and a longer portion 29 which ends into a folded-back part 29 adapted to be brought in engagement with a roller 30 mounted onto one end of a pivoting lever 31 the other end of which is made fast with the axis 32 of a rotary potentiometer 33. This potentiometer is mounted onto the pedal body 18. As shown on FIG. 2 the movable pad 23 may pivot about the axis 24 with respect to the stationary pad 22 until it reaches the position shown in broken lines wherein it is bearing onto the stationary pad. Thus the movable pad 23 is displaceable with respect to the stationary pad 22 through the distance shown at A on FIG. 2. This angular displacement of the pad 23 causes the rotation of the potentiometer 33 through the angle α. When the movable pad 23 reaches its position shown in broken lines it becomes fast for joint rotation with the pedal body 18. If the operator keeps acting upon the pedal 23 the latter would pivot together with the pedal body 18 about the axis 19 down to the position shown in broken lines. The pivotal stroke or displacement of the whole pedal is shown at B.

The brake device according to the invention which has just been described operates as follows:

To stop or brake the vehicle the driver would lift the foot from the accelerator 9 (FIG. 1), whereby the electric machine 1 is caused to work as a current generator and to feed its energy into the storage battery 15. Thus is obtained a motor braking effect. If the driver wishes to increase the braking of the vehicle he would act upon the brake pedal 9 in two steps.

During the first phase or step he would exert a slight pressure with the foot onto the movable pad 23 which then pivots about its axis 24 while the pedal body 18 remains inmovable. The pivoting motion of the movable pad 23 causes the lever 31 of the potentiometer 33 to turn. The latter fed by a stationary voltage of 15 volts for instance will keep supplying an electric voltage proportional to the angle of rotation of the lever comprised between 0 and 15 volts. This voltage is fed to the central control device 7 which generates the control signals to be applied to the armature and field control devices 4, 5 determining the energy returned to the storage battery 15.

The second phase or step begins when the movable pad 23 reaches its position shown in broken lines on FIG. 2 wherein it comes into bearing engagement with the stationary pad 22. When the driver increases the pressure of the foot the whole pedal will then start to pivot about the axis 19 towards the position shown in broken lines on the left-hand side of FIG. 2 in the same way as the brake of a vehicle fitted with an internal combustion engine. The mechanical braking thus produced would superpose itself to the electric braking.

It is easily understandable that the reference characters A and B of FIG. 2 show the electric brake phase and the simultaneous electrical and mechanical braking phase, respectively. The angle α illustrates the optimum efficiency range of the potentiometer.

The present invention exhibits a great number of advantages with respect to the state of the art. It allows a maximum recovery of the electric energy during braking and a decrease in the wear of the mechanical brake pad plates. It provides for a pleasantness of driving owing to the complementarity of both systems, namely the electrical and mechanical systems. Moreover the safety of the vehicle is increased.

What is claimed is:

1. A brake device for an automotive vehicle including an engine adapted to operate in response to a control signal alternately as an electric motor for driving the vehicle and as a generator for generating electrical energy when said vehicle is moving, an electric power source, means for feeding electric energy from said power source to said engine when said engine is working as a motor and means for transferring electrical energy generated by said engine to said power source when said engine is working as a generator and an electrical device for producing said control signals in accordance with operations of a driver of the vehicle, said brake device comprising mechanical brake means including a brake pedal having a pedal body mounted pivotally about a pivot axis carried by a stationary vehicle support structure, said mechanical brake means adapted to cause mechanical braking of the engine when pivoting about said axis, electrical brake means including means for generating control signals to said electrical device to cause transfer of electrical energy to said power source, thereby providing a braking effect to said engine, and a lever pivotally connected to said pedal body to effectuate a pivoting movement in response to an actuating operation produced by the vehicle driver, said lever controlling said means for generating control signals, said lever being pivotable into a first position in which it activates said means for generating control signals and thereby selectively activating only said electrical brake means until said lever reaches a threshold angle at which said lever is locked with said pedal body to become pivotally secured therewith, said lever and said pedal body being jointly pivotable into a second position exceeding said threshold angle which activates said mechanical brake means.

2. The braking device of claim 1, wherein said pedal body includes a free end opposite to an end connected to said pedal body, said pedal body comprising a pad portion which extends in the pivoting path of said lever and to which said lever is pivotally connected, said pad portion constituting a stop means for said lever on which said lever becomes locked when it reaches said threshold angle.

3. The braking device of claim 2, wherein said means for generating control signals comprises a potentiometer mounted on said pedal body and having a slide movably controlled by said lever, said potentiometer being adapted to produce an output signal from a constant electric feeding voltage applied to the potentiometer proportional to the pivoting movement angle of said lever.

4. The brake device of claim 3, wherein said potentiometer is a rotary potentiometer having an axis secured to an end of a pivoting potentiometer lever, the opposite end of said pivoting potentiometer lever being coupled to said free end of said lever.

5. The brake device of claim 4, wherein said free end of said pivoting potentiometer lever carries a roller and said free end of said lever is shaped to form a folded back portion in engagement with said roller.

6. The brake device of claim 2, wherein said lever comprises beyond its pivot axis a portion adapted to activate a limit switch carried on said pedal body.

* * * * *

UNITED STATES PATENT AND TRADEMARK OFFICE
CERTIFICATE OF CORRECTION

PATENT NO. : 5,062,317
DATED : November 5, 1991
INVENTOR(S) : Bernard SALIBA

It is certified that error appears in the above—identified patent and that said Letters Patent is hereby corrected as shown below:

On Title Page item [73]:

Assignees: Automobiles Peugeot; Automobiles Citroen, both of France

Signed and Sealed this

Ninth Day of March, 1993

*Attest:*

STEPHEN G. KUNIN

*Attesting Officer*     *Acting Commissioner of Patents and Trademarks*